Figure 1:
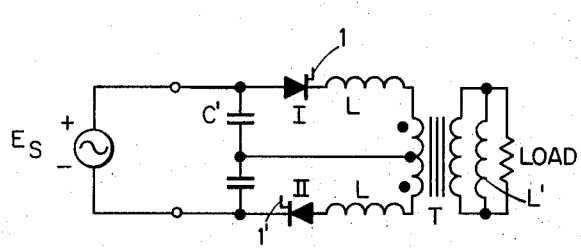

United States Patent [19]
Ver Planck et al.

[11] 3,832,573
[45] Aug. 27, 1974

[54] OVER-CURRENT LATCH-UP PROTECTION APPARATUS FOR SCR INVERTER CIRCUITS AND THE LIKE

[75] Inventors: Peter Ver Planck, Newton; Paul R. Johannessen, Lexington, both of Mass.

[73] Assignee: Megapulse Incorporated, Bedford, Mass.

[22] Filed: Feb. 15, 1973

[21] Appl. No.: 332,667

[52] U.S. Cl............ 307/202, 307/252 M, 307/305, 317/33 SC, 321/12
[51] Int. Cl. ................................................ H02h 7/14
[58] Field of Search .......... 307/202, 252 L, 252 M, 307/305; 321/12, 13; 317/33 SC

[56] References Cited
UNITED STATES PATENTS
3,412,309  11/1968  Boonstra............................. 321/12
3,569,819  3/1971  Martzloff et al...................... 321/12

*Primary Examiner*—John Zazworksy
*Attorney, Agent, or Firm*—Rines and Rines; Shapiro and Shapiro

[57] ABSTRACT

This disclosure deals with over-current latch-up protection apparatus for SCR inverter circuits and the like, wherein an L-C network of frequency substantially lower than the inverter output frequency is interposed between the D. C. supply and the inverter to discharge through a short-circuiting inverter fault in such a way that the inverter's supply voltage is momentarily reversed, enabling the recovery of the SCRs to their non-conductive state, without over-current damage.

5 Claims, 3 Drawing Figures

OVER-CURRENT LATCH-UP PROTECTION APPARATUS FOR SCR INVERTER CIRCUITS AND THE LIKE

The present invention relates to over-current latch-up protection apparatus for SCR or similar switching circuits and the like, being more particularly concerned with preventing destructive over-currents in such SCR circuits caused by failure of one or more SCR's to turn off, so that a direct short circuit is established via the SCR between the D. C. supply bus and ground—so-called "latch-up." Such fault conditions may result from a variety of sources, including false logic triggers, voltage spikes on the supply line, etc., and usually lead to the resulting over-current destruction of at least one SCR by fusing its semi-conductor junction.

Techniques for affording some protection have required the use of high-speed fuses in series with each SCR, thus to interrupt fault currents before they reach a destructive magnitude. At best, however, this is a touchy procedure, since a single fuse failure may trigger a cascade of other failures; and one or more fuses often fail to open fast enough to prevent SCR destruction. The nuisance and expense of fuse replacement, moreover, is considerable, and often leads to substantial equipment downtime. High-speed magnetic circuit breakers have also been proposed as a partial solution, but, in general, they are much slower acting than even fuses. In certain push-pull systems, magnetic relay circuit breakers responsive to similar-polarity output signals caused by abnormal operation have been proposed, as described, for example, in U.S. Pat. No. 3,328,598; but again, these are specialized applications and subject to magnetic circuit breaker problems. The art, however, has had to put up with these disadvantages and difficulties prior to the present invention.

An object of the present invention, accordingly, is to provide a new and improved over-current protection apparatus for SCR and similar switching circuits that obviates the difficulties with fuses and magnetic circuit breakers and, to the contrary, provides for reliable and continual latch-up prevention.

A further object is to provide a novel protected switching circuit of more general applicability, as well.

Other and further objects are explained hereinafter and are more particularly delineated in the appended claims. From one of its broader points of view, however, the invention contemplates, in summary, an inductor-capacitor network with appropriate resistive damping placed between the D. C. supply and the SCR switching circuit, arranged so that its natural period is substantially greater or longer than the longest normal SCR conduction interval of the SCR switching circuit. When a fault occurs in the SCR switching circuit, the latter interval is abnormally long, causing the L-C protection network to discharge through the fault in such a way that the supply voltage of the switching circuit is momentarily reversed, this supply reversal causing the SCRs in the fault path to recover to their non-conducting state without damage. Preferred details are hereinafter discussed.

Figure 2:
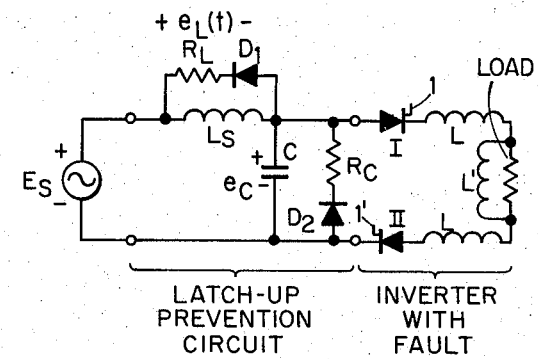
Figure 3:
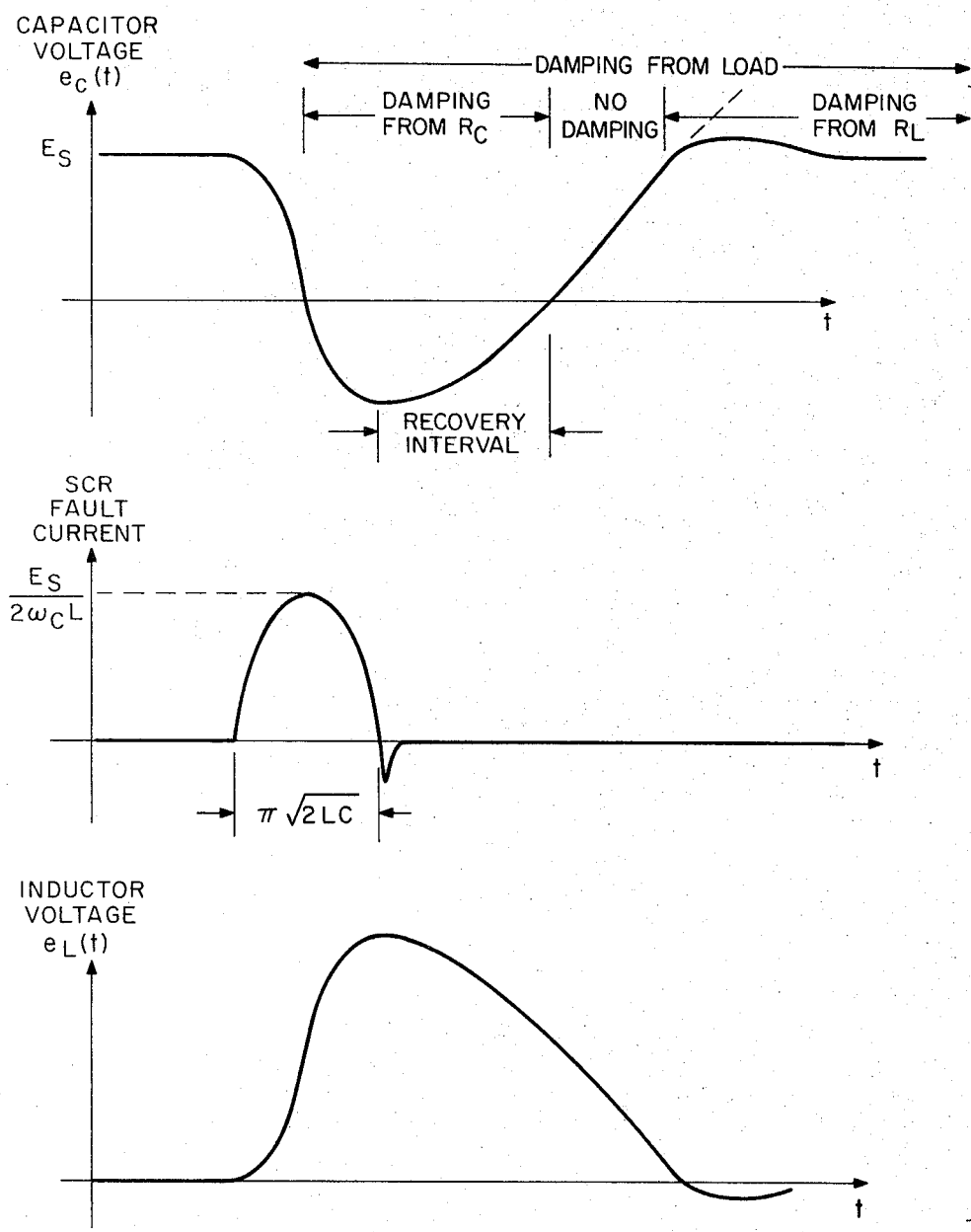

The invention will now be described with reference to the accompanying drawing, FIG. 1 of which is a schematic circuit diagram of a conventional prior-art series inverter switching circuit for generating, for example, high-frequency sine waves from a D. C. supply;

FIG. 2 is a similar diagram illustrating the preferred protective network of the invention interposed in a circuit such as the circuit of FIG. 1, the latter being shown simplified and in a short-circuit fault condition; and FIG. 3 is a three-graph presentation of the network capacitor voltage, the SCR fault current and the network inductor voltage, respectively, as a function of time during recovery from the fault.

While the invention is illustrated in connection with an inverter type switching circuit, it will hereinafter be evident that this is but illustrative of, and but one specific type of, switching circuit with which the invention may usefully be employed.

Referring to FIG. 1, a typical form of such circuit is shown comprising a pair of switching rectifiers I and II, preferably of the solid-state SCR type (though also possibly other well-known switching devices), series-connected to a D.C. voltage supply source $+$, $-$, ($E_s$), with a pair of shunt-connected supply capacitors $C'$ and series inductors L, in turn connected through the primary or left-hand winding of an output transformer T, the secondary winding of which feeds a load, so-labelled, preferably shunted by an inductor $L'$. The transformer primary is center-tapped and connected to the junction between the pair of capacitors $C'$ such that, upon alternate triggering of the respective gate electrodes 1 and $1'$ of the pair of SCR's I and II, respectively, the capacitors will alternately charge and thereupon apply opposite polarity sine-wave voltage through the output transformer T to the load, as is well-known. In such inverter sections for generating high-frequency sine waves from a DC supply, the SCR's thus triggered or switched alternatively, are operated such that one is always "off" or non-conductive when the other is triggered "on" or rendered conductive. If the "off" device happens to turn "on" accidently, due to a false trigger or other transient, a direct short circuit will be established across the D. C. supply. In general, the D. C. supply resistance is very low, so that such a fault current may be extremely large, perhaps thousands of amperes which can readily melt the SCR's if allowed to persist for more than a few milliseconds.

In accordance with the present invention, such damage is obviated by the interposition between the D. C. supply $+$, $-$ and the switching SCR's I and II, of a protection network comprising series inductance $L_s$, FIG. 2, and shunt capacitance C. In FIG. 2, the circuit is shown in the before-mentioned fault condition represented by I, II and the inductances L. The load is shown optionally shunted by further inductance $L'$, as in the embodiment of FIG. 1. During the normal operations of the inverter, without fault, the protection circuit $L_sC$ acts like a low-pass filter between the supply and the circuit, with the output capacitor C supplying peaks of current to the circuit and the inductor isolating the supply from the consequent ripple voltage. The average capacitor voltage $e_c$ is substantially equal to the supply voltage $E_s$, and the average voltage $e_L$ across the series inductor $L_s$ is zero.

Upon initiation of the fault, however, the output capacitor C tends to dump its charge through the fault at an angular frequency $\omega_c = 1/\sqrt{C(2L)}$. The peak value of fault current (center graph of FIG. 3) is reached when $e_c$ (top graph of FIG. 3) passes through zero, and is equal to $E_s/2\omega_c L$. Generally, the SCR's can pass a single short-duration current pulse of very large magnitude without damage. The SCR fault recovery interval begins when $de_c/dt$ reverses sign, and if a period greater than the SCR recovery time elapses before $e_c$ again becomes positive, the fault path will be interrupted, with both SCR's recovering to their forward-blocking state.

After fault interruption, the combination $L_sC$ in the protection circuit will continue to oscillate at its natural frequency $\omega_s = 1/\sqrt{L_sC}$. Means must be provided to damp out these oscillations to prevent excessive positive voltage from being developed across the inverter terminals. The diode-resistor network $D_2$-$R_c$ shunting capacitor C dissipates energy during the time when the capacitor voltage is negative, i.e., $e_c < 0$. This network, however, is optional since often the load provides sufficient damping. The load may even over-damp the protection network, in which case a shunt inductor must be added to provide a path for the low-frequency transient caused by the protection network. The combination of the D. C. source +, −, and inductor $L_s$ then tends to charge C to twice the supply voltage $E_s$ by the well known resonant-charge process. If this charging were allowed to proceed, however, the resultant overvoltage on the inverter could cause additional faulting. Hence, a second diode-resistor network $D_1$-$R_L$, which is the essential damping network, is connected across the supply inductor $L_s$ to dissipate energy as soon as the inductor voltage becomes negative; i.e., as soon as the capacitor voltage $e_c$ exceeds its normal, operating value $E_s$; to the far right in FIG. 3. Normal logic firing of the inverter SCR's can then be resumed as soon as the supply voltage transient settles out.

While shown applied to the serious problem in the illustrative series inverter circuit, the invention is clearly more generally useful wherever its advantages for the protection of such switching devices as SCR's and the like (all hereinafter generally designated as SCR's) are desired; and further refinements and modifications will also occur to those skilled in this art, all such being considered to fall within the spirit and scope of the invention as defined in the appended claims.

What is claimed is:
1. Over-current protection apparatus having, in combination, switching circuit means comprising direct-current supply means connected with normally nonconductive switching means adapted to be periodically rendered conductive for predetermined conduction intervals; inductance-capacitance network means including series-connected inductance and shunt-connected capacitance connected between the supply means and the switching means and tuned to a resonant frequency of period substantially greater than said predetermined conduction intervals to serve during normal operations of the switching circuit means as a low-pass filter; and the network means being adjusted such that, upon the development of a fault short-circuiting the supply means, the network means discharges through the fault and the switching means and momentarily causes the voltage applied to the switching means to reverse sign, permitting the recovery of the switching means and thereby limiting the duration of the fault current, said capacitance being shunted by means for dissipating energy during the time the capacitance is of negative voltage, and said inductance being shunted by means for dissipating energy as soon as the inductance voltage becomes negative.

2. Over-current protection apparatus as claimed in claim 1 and in which said switching means comprises SCR means.

3. Over-current protection apparatus as claimed in claim 1 and in which the said dissipating means comprises diode-resistor network means.

4. Over-current protection apparatus as claimed in claim 1 and in which said switching circuit means is of the inverter type, said predetermined conductive intervals being the period of the alternating current frequency produced by the switching means inversion from the direct current supply.

5. Over-current protection apparatus as claimed in claim 4 and in which said inverter means comprises at least a pair of switching means, such as SCR's, normally triggered to be rendered alternately conductive, but rendered simultaneously conductive under fault.

* * * * *